Figure 8:
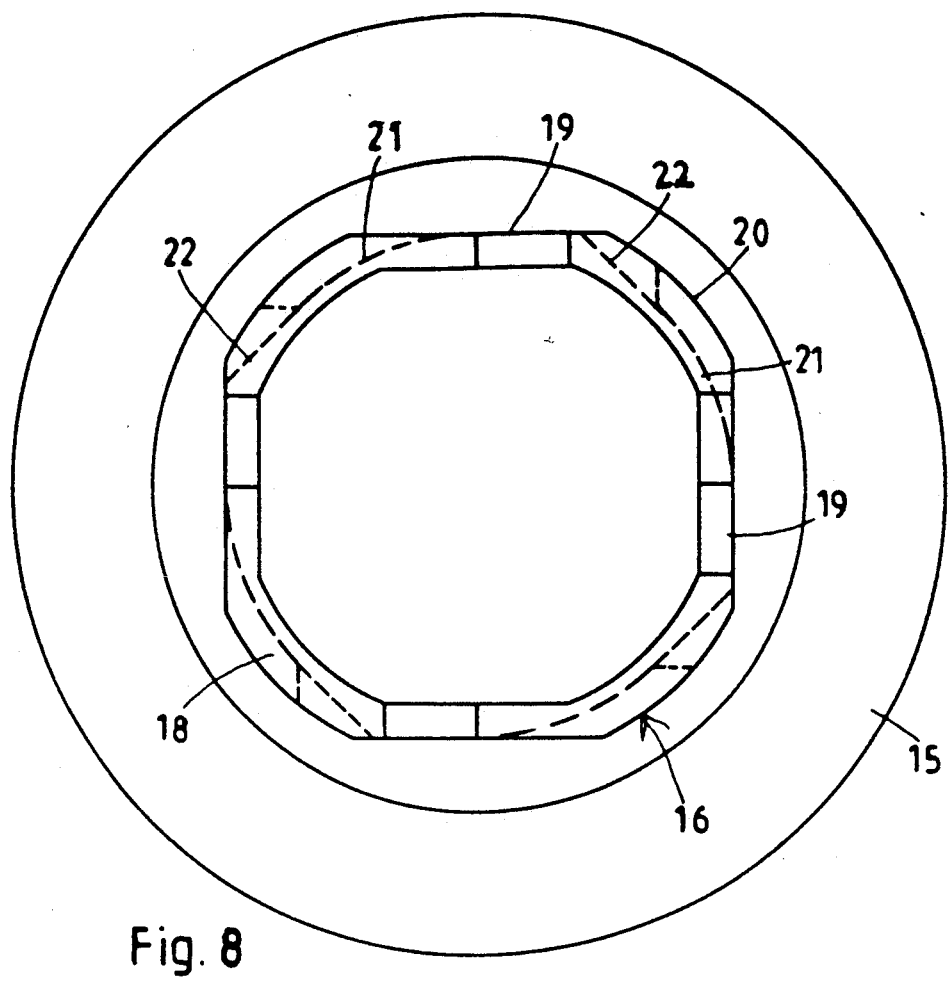

United States Patent
Schulte et al.

[11] Patent Number: 5,248,849
[45] Date of Patent: Sep. 28, 1993

[54] SPRAY-PROTECTED CONNECTION HOUSING FOR ELECTRICAL CONSUMERS

[75] Inventors: Siegfried Schulte, Lüdenscheid; Manfred Aulmann, Schalksmühle, both of Fed. Rep. of Germany

[73] Assignee: Modelec S.A., Delemont, Fed. Rep. of Germany

[21] Appl. No.: 720,849
[22] PCT Filed: Nov. 15, 1989
[86] PCT No.: PCT/EP90/01944
§ 371 Date: Jul. 15, 1991
§ 102(e) Date: Jul. 15, 1991
[87] PCT Pub. No.: WO91/07794
PCT Pub. Date: May 30, 1991

[30] Foreign Application Priority Data
Nov. 15, 1989 [DE] Fed. Rep. of Germany ....... 3937965
Apr. 19, 1990 [DE] Fed. Rep. of Germany ....... 4012443
May 2, 1990 [DE] Fed. Rep. of Germany ....... 4014050

[51] Int. Cl.⁵ ............................................. H02G 3/08
[52] U.S. Cl. .................................. 174/65 R; 285/158; 285/396
[58] Field of Search ............ 174/65 R, 153 R, 153 G; 285/158, 189, 396, 402

[56] References Cited
U.S. PATENT DOCUMENTS
982,535 1/1911 Rudkiewicz ...................... 174/65 R
1,131,399 3/1915 McGinley ........................ 174/65 R
4,103,101 7/1978 Maier ................................ 174/65 R
4,620,061 10/1986 Appleton ............................ 174/51

FOREIGN PATENT DOCUMENTS
2824477 3/1979 Fed. Rep. of Germany .

Primary Examiner—Leo P. Picard
Assistant Examiner—David A. Tone
Attorney, Agent, or Firm—Bacon & Thomas

[57] ABSTRACT

An adapter box having a base structure that has an annular sealing ridge on the cover side and with a cover that has a sealing effect with an annular sealing strip in conjunction with the sealing ridge. The technical problem is complete sealing of the adapter box in the area of the cover and of a connector so that jet-proofing is attained. The sealing strip (54) has a trough-shaped section (35) overlapping the sealing ridge (7), and the sealing ridge (7) has two tongues (32) separated by a gap (33). Each window (11) formed as a cutout in a wall (3) has a contour consisting of straight sections (12) and centric arc sections (13) with the same radius, which together form in each case a one nth partial arc, with n=3, 4..., of the full arc. The collar (18) of the sealing flange has an external contour identical with the contour of the window (11). The neck (17) of the sealing flange (16) has in each case partial sections extending over one nth partial arc from one arc section (21) starting from the center of a straight section (19) and a straight section (22) running at a tangent to it.

21 Claims, 5 Drawing Sheets

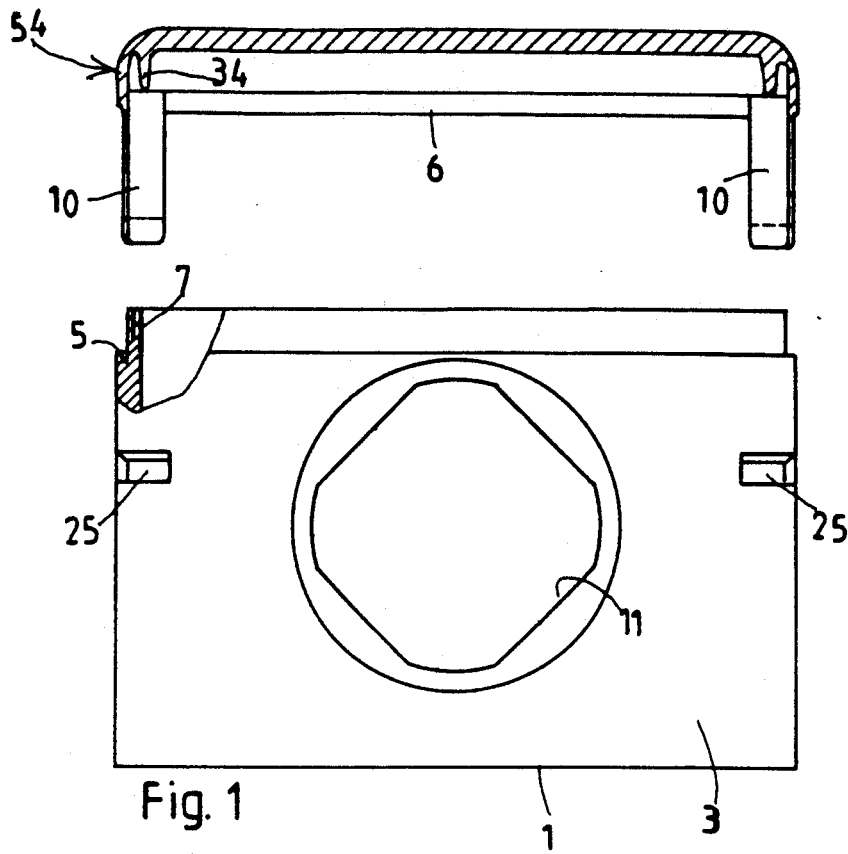
Fig. 1
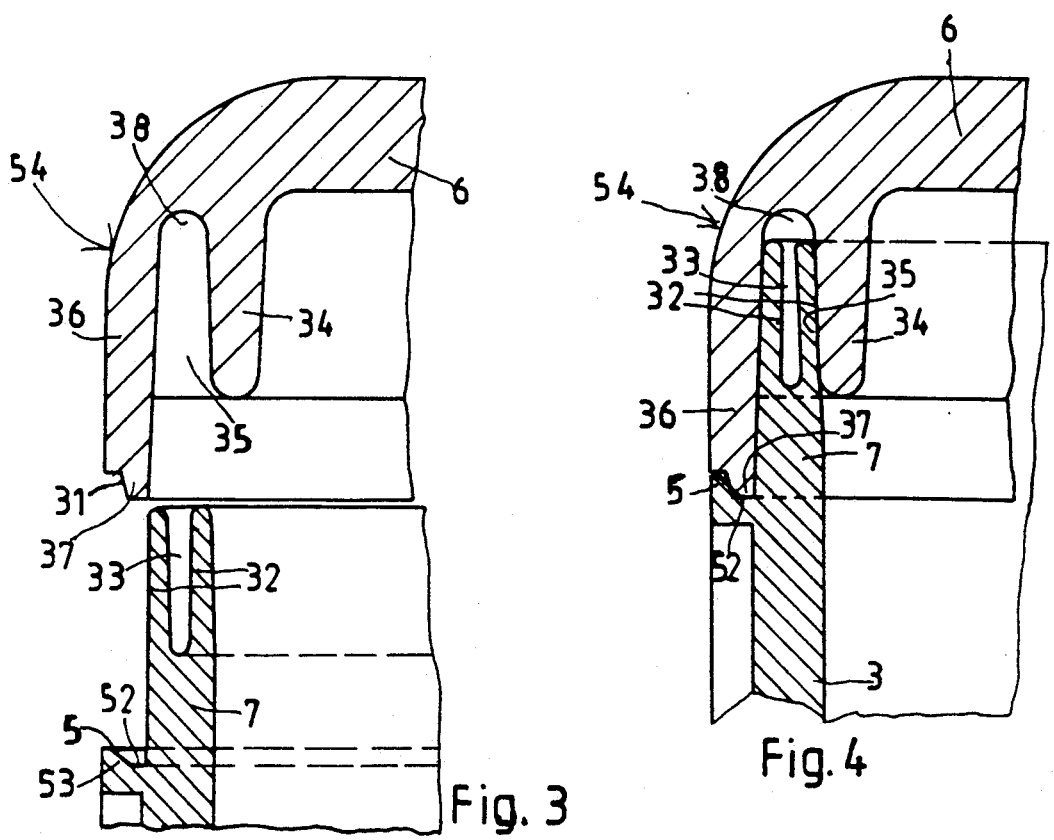
Fig. 3
Fig. 4

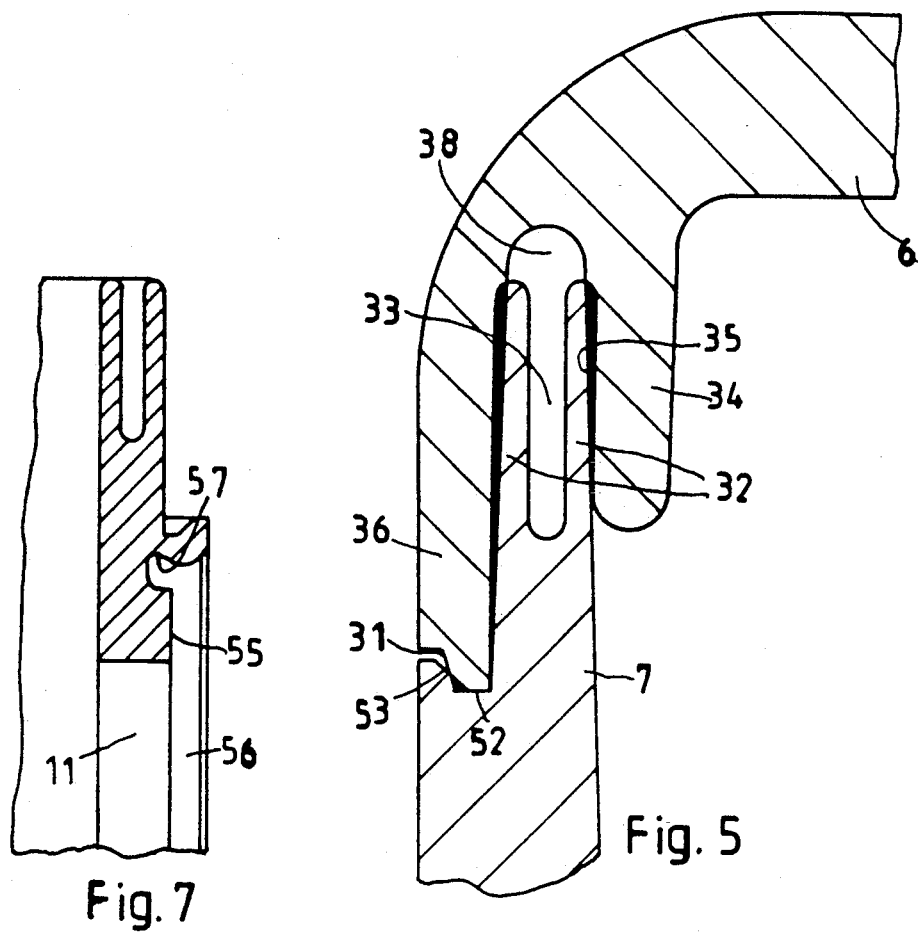
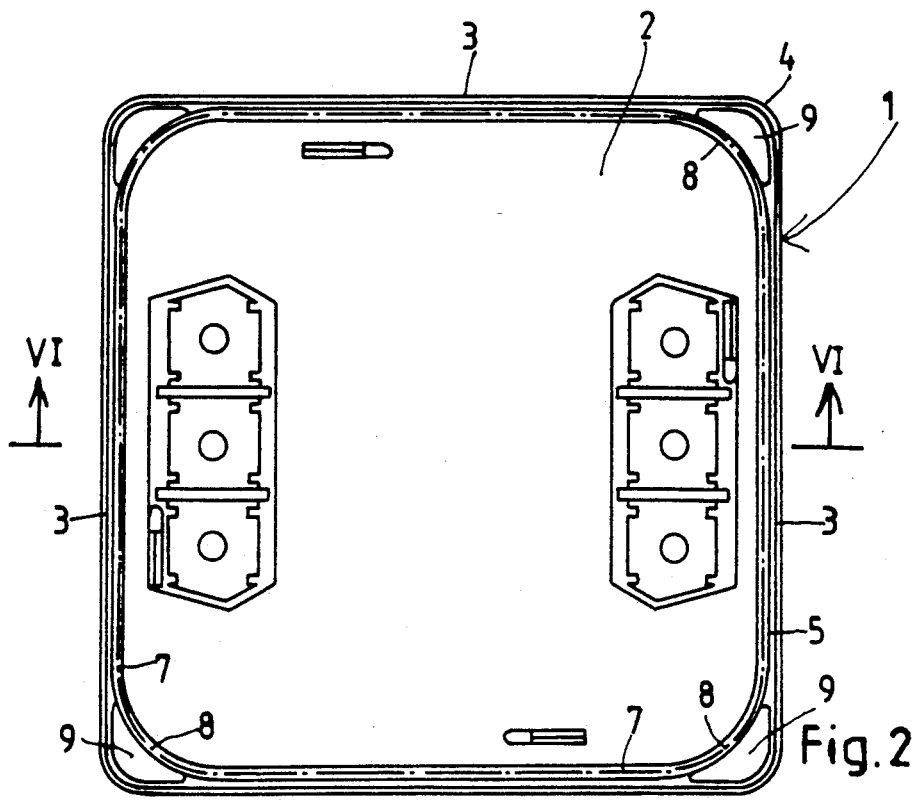

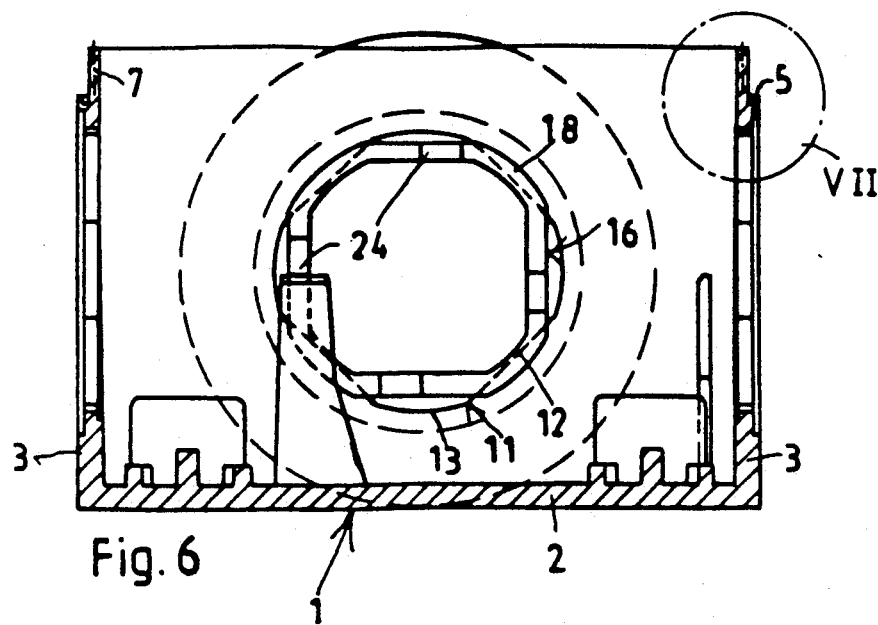
Fig. 6
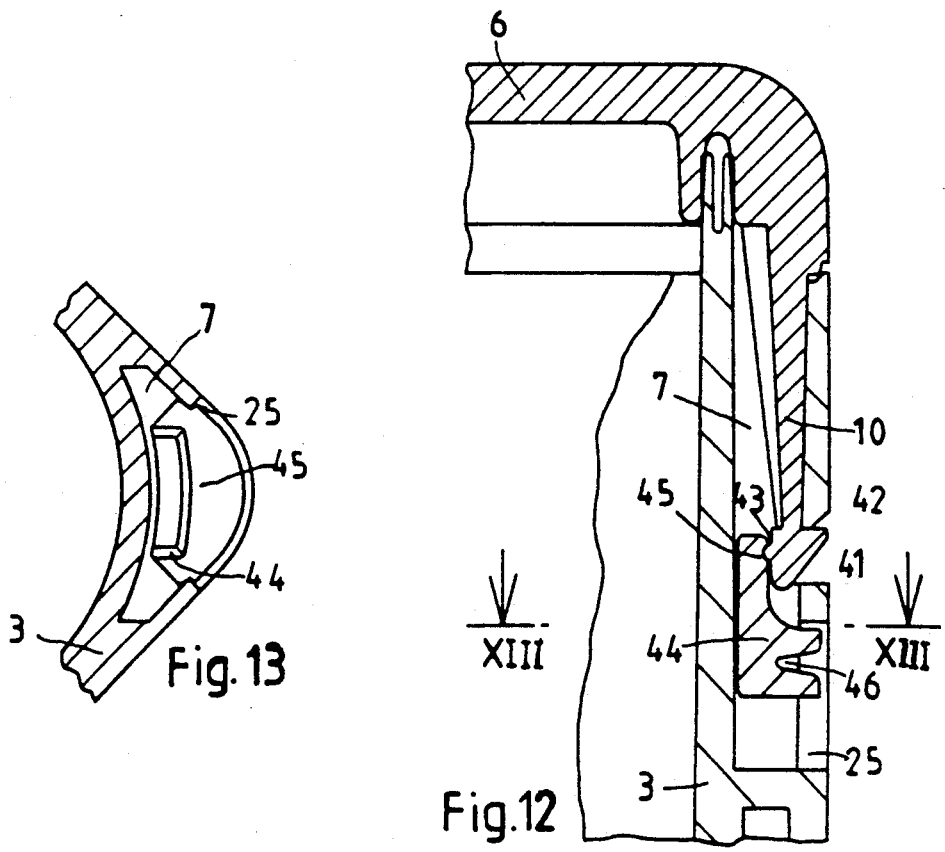
Fig. 13
Fig. 12

SPRAY-PROTECTED CONNECTION HOUSING FOR ELECTRICAL CONSUMERS

DESCRIPTION

1. Technical Field of the Invention

The invention relates to a jet-proof adapter box or connection housing for electrical consumers with a base structure that has an annular sealing ridge on the cover side and with a cover that has a sealing effect with an annular sealing strip in conjunction with the sealing ridge, with the walls of the base structure having windows, each of which holds a sealing flange of a connector.

2. Prior art

Such an adapter box is described in DE-GM 80 08 956. The sealing between the base structure and the lid is very problematic. Although several ring steps are foreseen, which provide a labyrinthine seal, it is hardly possible for a seal complying with the regulations for jet-proof installation equipment to be realized.

SUMMARY OF THE INVENTION

Object of the invention is a complete seal of the adapter box in the area of the cover and of a connector, so that jet-proofing is attained.

According to the invention, this object is solved in that the sealing strip has a trough-shaped section overlapping the sealing ridge and that the sealing ridge has two tongues separated by a gap.

The invention differs from the prior art in that the trough-shaped section on the end face of the tongues forms a space so that the sealing surface and thus the capillary leakage paths are interrupted in this area. The capillary pressure is thus cancelled. As a result of this, a perfect sealing can be attained, as the outer leakage paths end in this space, so that no water can penetrate even into this gap. The tongues ensure a perfect sealing as a result of the deformation within the trough-shaped section.

An improved sealing effect is attained in that the width of the sealing ridge is greater than the inside width of the trough-shaped section.

In order that the capillary leakage paths are interrupted for a large path section, the invention provides according to a further development for the trough-shaped section to leave a space free above the ends of the tongues when the adapter box is in an assembled state.

An additional seal is attained in that the sealing ridge has an annular external step with a peripheral trough and that the sealing strip engages with a face edge in the peripheral trough.

An external seal is assured in that the external step and the face edge each have conical surfaces.

This external seal is designed with exceptional reliability in that the external conical surface of the face edge is steeper than the corresponding conical surface of the peripheral trough.

A seal in the connector area is attained in that each window formed as a cutout in a wall has a contour consisting of straight sections and centric arc sections with the same radius, which together form in each case a one nth partial arc, with n=3, 4 . . . , of the full arc, that a collar of the sealing flange of the connector has an external contour identical with the contour of the window and that the neck of the sealing flange has in each case a partial section extending over one nth partial arc from one arc section starting from the center of a straight section and a straight section running at a tangent to it.

The sealing flanges of the connectors are designed as swivel connections that are tightened firmly on being inserted by being swivelled through a partial arc.

The interlocking path is determined in that the arc section of the partial section of the neck extends across half the partial arc.

Firm tightening and a good seal are attained in that the underside of the flange has in each case a sloping profile rising towards the arc section.

A right-angled alignment is attained in each case in that the contour of the window and the neck profile are dimensioned in a four-fold manner respectively. The connector can thus be aligned in four different positions, each of them offset at 90° to each other.

A high degree of security against unintentional actuation is attained in that, in relation to the insertion direction of the flange, the arc section of the neck profile extends towards the straight section in clockwise direction. This means that the tightening of the flange connection is done by means of a counter-clockwise rotation. A releasing movement due to a counter-clockwise rotation thus leads to intensified tightening.

A lock in the tightened position is attained in that the flange acts on an engaging principle with the window.

An execution of the engagement is formed in that engaging teeth that act in conjunction with at least one engaging tongue of the base structure are located on the face surface of the sealing flange.

A lock from the cover side is facilitated in that engaging teeth that act in conjunction with an engaging tongue of the box cover are located on the face surface of the sealing flange. The connector can be locked into place before or after putting on the cover.

A releasability of the engagement is ensured in that the engaging tongues are designed so as to be disconnectable from the engaged position.

A closed and uniform configuration of the sealing line is attained in that the sealing ridge and the sealing strip run in the corner areas of the adapter box with an arc of greater diameter than the outside arc of the box and leave a sickle-shaped channel free in each case for the emergence of a retaining foot of the cover.

A form-fit latching of the box cover is ensured in that the retaining foot has an outwardly directed engaging lug that engages in a opening in the wall of the channel.

An unintentional interruption of the latching is prevented in that an interlocking slide that keeps the retaining foot engaged with the opening in the channel is located within the channel and can be moved in the longitudinal direction of the channel. Jet-proofing is attained in that an interruption of the engagement is not feasible even by a pressurized-water jet.

A securing of the interlocking slide is attained in that the interlocking slide has an interlocking profile that engages in interlock position with an interlocking profile of the retaining foot.

A self-holding of the interlocking slide is attained in that the interlocking slide has a sickle-shaped cross section corresponding to the cross section of the channel.

SHORT DESCRIPTION OF THE DRAWINGS

Figure 9:
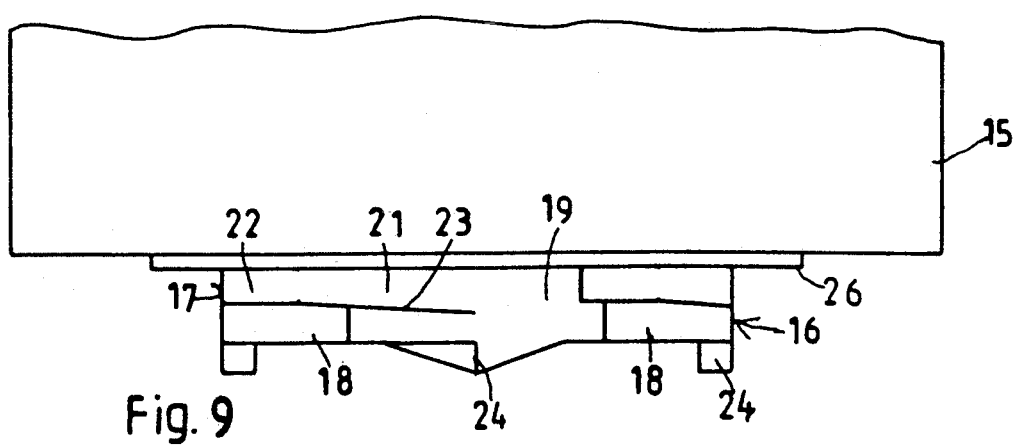
Figure 10:
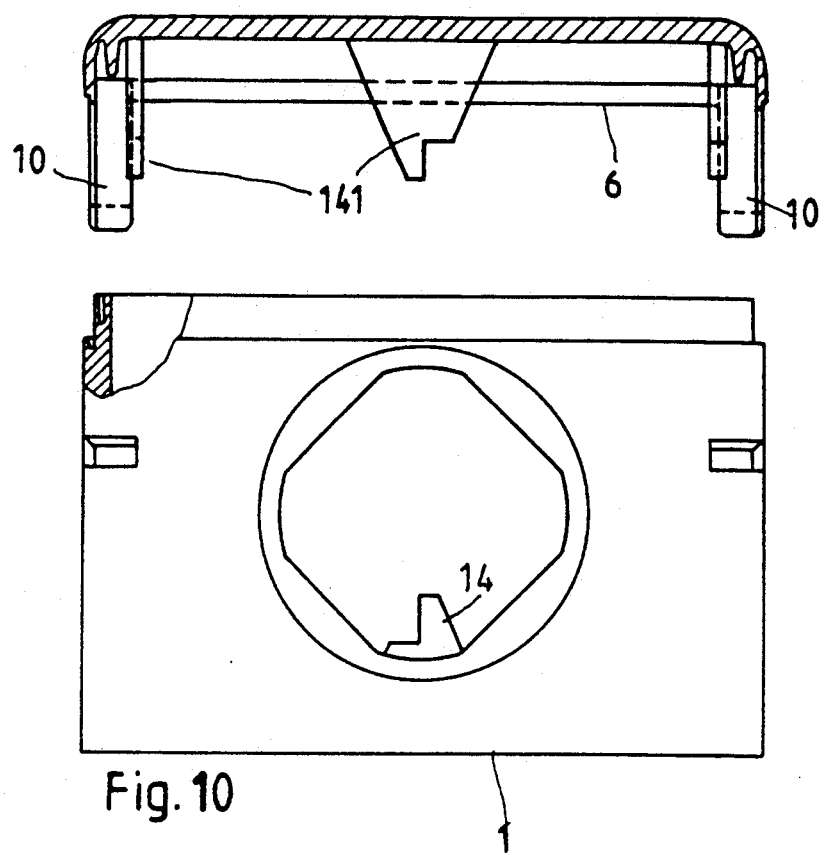
Figure 11:
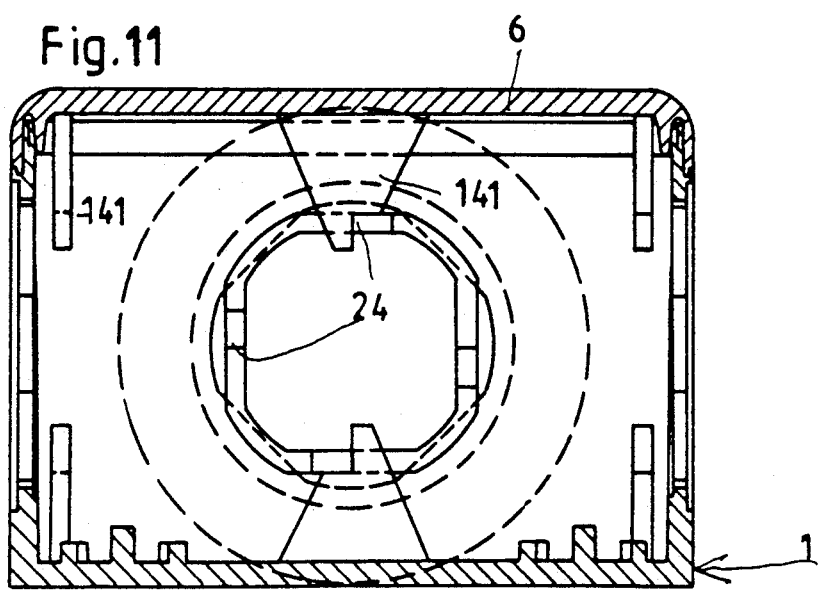

Embodiments of the invention will be described in the following with reference to the accompanying drawings, wherein FIG. 1 is a view of an adapter box consisting of base structure and cover, FIG. 2 is a plan view of the base structure, FIG. 3 is a partial section through the top edge of the base structure and the cover to explain the seal, FIG. 4 is a view of the cover in assembled state, FIG. 5 is an enlarged detail to explain the sealing sections, FIG. 6 is a section along line VI—VI in FIG. 2, FIG. 7 is an enlarged section VII in FIG. 6, FIG. 8 is an enlarged front view of a connector, FIG. 9 is a plan view of FIG. 8, FIG. 10 is a view corresponding with FIG. 1 of a modified version of the adapter box, FIG. 11 is a section of the adapter box with put-on cover in interlock engagement with a connector, FIG. 12 is an enlarged detail of the layout of a retaining foot in connection with the sickle-shaped channel, and FIG. 13 is a section along line XIII—XIII in FIG. 12.

EMBODIMENTS

The base structure 1 comprises substantially a base wall 2 and four side walls 3. The base structure 1 is open at the top face edge, i.e. on the cover side. The corners of the top face edge are designed as external arcs 4. The top face edge has an annular external step 5 as a limit stop and sealing edge for a cover 6. A sealing ridge 7, which is to be explained in detail, is attached to the external step 5. The sealing ridge 7 and the external step 5 have an annular design and have in the corner areas arc sections 8 of a greater diameter than the external arcs 4, so that between each external arc 4 and the pertinent arc section 8 a sickle-shaped channel 9 is delimited for the emergence of a retaining foot 10 of the cover 6.

Within each side wall 3 and, where applicable, also within the base wall 2 a window 11 is formed that has a profiled cutout and serves to hold connectors, which is to be explained in further detail. Openings 25 with engaging surfaces for the retaining feet 10 are provided in the corner areas.

The sealing ridge 7 ends on the front face in two tongues 32 that are separated by a gap 33 so that the tongues 32 can be deformed against each other. The external step 5 has a peripheral trough 52, with the peripheral trough 52 passing via a conical surface 53 into the external peripheral step 5.

The cover 6 has an annular sealing strip 54 that is aligned with the sealing ridge 7. The sealing strip 54 has two legs 34 and 36 that delimit a trough-shaped section 35. The inside width of the section 35 is smaller than the distance between the external sides of the tongues 32. The leg 36 ends in an inwardly offset face edge 37 that is offset via a conical surface 31. The conical surface 31 is steeper than the conical surface 13 and also somewhat deeper.

FIG. 3 shows the parts of the seal of the cover, i.e. in particular the sealing ridge 7 and the sealing strip 54 in their state when separated from each other. It is clearly recognizable that the external width of the tongues 32 is greater than the inside width of the trough-shaped section 35. When the cover 6 is put on in accordance with FIG. 4, the tongues 32 are pressed against each other and thus lie with a sealing effect against the inner surface of the trough-shaped section 35. The trough-shaped section 35 forms over the face edge of the tongues 32 a space 38 that is left free. The face edge 37 fits into the peripheral trough 52. As the conical surface 31 is steeper than the conical surface 53, the conical surface 53 is partially displaced so that a secure seal is attained.

FIG. 5 shows on an enlarged scale the proportions of the seal. The sealing ridge 7 with the tongues 32 is shown in undeformed state, as is the peripheral trough 52. It can be recognized how this undeformed profile of the tongues 32 penetrates into the trough-shaped section 35. This induces the described deforming. The reciprocal penetration of the conical surfaces 53 and 31 can also be recognized. A deforming of the material takes place in the area of this conical surface too, so that high sealing efficiency is assured there too. Leakage paths may possibly develop in the area of the conical surfaces 53 and 31 and of the sealing surface between the leg 36 and the external tongues 32. These leakage paths end, however, in the space 38, so that the capillary pressure is cancelled there and no leakage water can penetrate into this space 38. Any penetration into the sealing surface between the internal tongue 32 and the leg 34 is totally excluded. The invention thus ensures complete and reliable sealing in accordance with the regulations for jet-proofing of installation equipment.

The cover 6 is secured to the base structure in any way required, e.g. by means of the retaining feet 10, of screws or of other clamping elements.

In accordance with FIGS. 1 and 6, the window 11 has a contour consisting of straight sections 12 and arc sections 13. One straight section 12 and arc section 13 respectively extend over a quadrant so that a four-fold division of the contour is provided in accordance with FIG. 1. In general, one straight section and one arc section can extend over a one nth partial arc, with n=3, 4 .... In accordance with the division of the contour, the window 11 can be utilized in different positions. From the base wall 2, in accordance with FIG. 10, an engaging tongue 14, that is located opposite one edge of the window 11 and whose function is to be explained below in detail, juts up.

Each window 11 holds a sealing flange 16 of a connector. The sealing flange 16 is explained in detail in FIGS. 7 to 9 and consists of a neck 17, whose contour is to be described in detail, and an outward-projecting collar 18 that is composed of individual sections. The external contour of the collar 18 is identical with the contour of the window 11, so that the collar 18 can be pushed through the window 11. The contour of the collar 18 is also composed of straight sections 19 and arc sections 20.

The neck 17 has partial sections respectively, each of them composed of an arc section 21 starting from the centre of a straight section and a straight section 22 running at a tangent to it. At the end of the straight section 22 the contour is continued with a bend in the straight section 19. The arc section 21 extends in each case over half the stated arc. If, then, a quadrant is provided in accordance with the represented embodiment, the arc 21 extends over an octant or 45°.

The parts of the collar 18 extend over the arc section 21 and the straight section 22. A sloping profile 23 rising towards the arc section extends on the underside of the flange over the arc section 20. In the representation according to FIGS. 8 and 9, the insertion direction of the sealing flange is perpendicular to the drawing plane of FIG. 8, aligned as emerging from it. The arc section 21 extends from the stated center of the straight section 19, viewed in insertion direction, in clockwise direction. In FIG. 8 there is a counter-clockwise direction. This means that a tightening of the neck profile is attained within the window by means of a counter-clockwise rotation after insertion of the sealing flange 26. The sealing flange 26 has a cylindrical peripheral surface that seals the window 11 within a sealing step 55. The sealing step 55 has an approximately cylindrical sealing wall 56 and an undercut groove 57. The sealing wall 56 preferably has a crowned profile. The peripheral surface of the sealing flange 26 and the sealing wall 56 fit together firmly and with a sealing effect. The undercut groove 57 represents an interruption of the leakage paths and thus ensures moisture-proof sealing and jet-proofing.

Engaging teeth 24 that act in conjunction with the engaging tongue 14 and prevent the flange part from turning back are formed on the face side of the collar 18. The engaging tongue 14 is formed flexibly so that the engagement can be cancelled at any time and the connector can be removed.

FIGS. 10 and 11 show a modified embodiment in which, besides the engaging tongues 14 on the base, engaging tongues 141 are also located on the cover 6. With this layout, a corresponding engagement of the connector is possible, as shown in FIG. 11. After putting on the cover, the connector can be locked. The connector can be clamped into the base structure even before the cover is put on. The connector can also, on the other hand, be inserted and then clamped and locked after putting on the cover. After each respective removal of the box cover the connector is unlocked, and the tongues on the base can be deflected from the engagement position.

FIGS. 12 and 13 show in detail the securing and locking of the retaining feet 10. This locking is necessary to ensure that the retaining feet 10 are not unintentionally disengaged under the influence of jet-water, as the retaining feet are flexible in transverse direction of the channel. One retaining foot 10 has an engaging lug 41 that engages in an edge 42 of the opening 25. A locking section 43 is provided on the side opposite the engaging lug 41.

To lock the retaining foot 10, an interlocking slide 44 with a sickle-shaped cross-section is provided; this valve can be inserted in the opening 25 and held in the sickle-shaped channel 10, as can be seen especially in the cross-section of FIG. 13. The interlocking slide 44 has on the one hand a paired interlocking profile 45 corresponding to the interlocking profile 43 and on the other hand an actuating slot 46 or another actuating device. The interlocking slide 45 can be moved in longitudinal direction of the channel. A screwdriver point, for example, can be inserted in the actuating slot 46.

Each time the cover 6 is put on, the engaging lug 41 latches at the edge 42 of the opening 25. To secure and lock the retaining foot 10 in this engagement position, the interlocking slide 44 is pushed into the interlock position drawn in FIG. 13, in which the interlocking profiles 43 and 45 engage with each other. The interlocking slide 44 clamps the retaining foot 10 against the outside wall of the channel 9. This locks the retaining foot 10 into engagement position so that an interruption of the latching is not feasible even when pressure is applied. Jet-proofing of the latching has been shown to be ensured by this configuration.

We claim:

1. An adapter box comprising a base structure that has an annular sealing ridge on the cover side and with a cover that has a sealing effect with an annular sealing strip in conjunction with the sealing ridge, the base structure including walls having windows, each of which holds a sealing flange of a connector, characterized in that each window (11) formed as a cutout in a wall (3) has a contour consisting of straight sections (12) and arc sections (13) with the same radius, which together form in each case a one nth partial arc, with $n = 3, 4 \ldots$, of the full arc, that the sealing flange of the connector (15) has a collar (18) which has an external contour identical with the contour of the window (11) and that the sealing flange has a neck (17) which has in each case a partial section extending over one nth partial arc and including one arc section (21) starting from the center of a straight section (19) and a straight section (22) running at a tangent to it.

2. Adapter box according to claim 1, characterized in that the arc section (21) of the partial section of the neck (17) extends across half the partial arc.

3. Adapter box according to claim 1, characterized in that the underside of the flange has in each case a sloping profile (23) rising towards the arc section.

4. Adapter box according to claim 1, characterized in that the contour of the window (11) and the neck profile are dimensioned in a four-fold manner respectively.

5. Adapter box according to claim 1, characterized in that, in relation to the insertion direction of the flange, the arc section (21) of the neck profile extends towards the straight section in clockwise direction.

6. Adapter box according to claim 1, characterized in that the flange acts on an engaging principle with the window.

7. Adapter box according to claim 1, characterized in that a cylindrical sealing step (55) of the window (11) encloses a peripheral surface of the sealing edge (26) with a sealing effect.

8. Adapter box according to claim 7, characterized in that an undercut groove (57) contacts the cylindrical sealing wall (56).

9. Adapter box according to claim 1, characterized in that engaging teeth (24) that act in conjunction with at least one engaging tongue (14) of the base structure (1) are located on the face surface of the sealing flange (16).

10. Adapter box according to claim 1, characterized in that engaging teeth (24) that act in conjunction with an engaging tongue (141) of the box cover (6) are located on the face surface of the sealing flange (16).

11. Adapter box according to claim 9, characterized in that the engaging tongues (14 or 141 respectively) are designed so as to be disconnectable from the engaged position.

12. Adapter box according to claim 1, characterized in that the sealing ridge (7) and the sealing strip (34) run in the corner areas of the adapter box with an arc (8) of greater diameter than the outside arc (4) of the box and leave a sickle-shaped channel (9) free in each case for the emergence of a retaining foot (10) of the cover (6).

13. Adapter box according to claim 12, characterized in that the retaining foot (10) has an outwardly directed engaging lug (41) that engages in a opening (25) in the wall of the channel (9).

14. Adapter box according to claim 12, characterized in that an interlocking slide (44) that keeps the retaining foot (10) engaged with the opening (25) in the channel (8) is located within the channel (9) and can be moved in the longitudinal direction of the channel.

15. Adapter box according to claim 14, characterized in that the interlocking slide (44) has an interlocking profile (45) that engages in interlock position with an interlocking profile (43) of the retaining foot (10).

16. Adapter box according to claim 14, characterized in that the interlocking slide (44) has a sickle-shaped cross section corresponding to the cross section of the channel (9).

17. Adapter box according to claim 1, characterized in that the sealing strip (54) has a trough-shaped section (35) overlapping the sealing ridge (7) and that the width of the sealing ridge (7) having two tongues (32) separated by a gap (33) is greater than the inside width of the trough-shaped section (35).

18. Adapter box according to claim 17, characterized in that the trough-shaped section (35) leaves a space (38) free above the ends of the tongues when the adapter box is in an assembled state.

19. Adapter box according to claim 17, characterized in that the sealing ridge (7) has an annular external step (5) with a peripheral trough (52) and that the sealing strip (54) engages with a face edge (37) in the peripheral trough (52).

20. Adapter box according to claim 19, characterized in that the external step (5) and the face edge (37) each have conical surfaces (53, 31).

21. Adapter box according to claim 20, characterized in that the external conical surface (31) of the face edge (37) is steeper than the corresponding conical surface (13) of the peripheral trough (12).

* * * * *

UNITED STATES PATENT AND TRADEMARK OFFICE
CERTIFICATE OF CORRECTION

PATENT NO. :   5,248,849

DATED      :   September 28, 1993

INVENTOR(S) :  SCHULTE et al.

It is certified that error appears in the above-identified patent and that said Letters Patent is hereby corrected as shown below:

On the title page, item [73] Assignee:

Please correct the address of the Assignee to read as follows:

Modelec S.A.
Rue St. -Maurice 7
CH-2800 Delemont
Switzerland

Signed and Sealed this

Seventeenth Day of May, 1994

Attest:

BRUCE LEHMAN

*Attesting Officer*          *Commissioner of Patents and Trademarks*